(12) United States Patent
Chen et al.

(10) Patent No.: US 9,135,507 B2
(45) Date of Patent: Sep. 15, 2015

(54) METHOD FOR SEARCHING A ROOF FACET AND CONSTRUCTING A BUILDING ROOF STRUCTURE LINE

(71) Applicant: National Central University, Taoyuan County (TW)

(72) Inventors: Liang-Chien Chen, Taoyuan County (TW); Yun-Jou Lin, Changhua County (TW)

(73) Assignee: NATIONAL CENTRAL UNIVERSITY, Jhongli, Taoyuan County (TW)

( * ) Notice: Subject to any disclaimer, the term of this patent is extended or adjusted under 35 U.S.C. 154(b) by 169 days.

(21) Appl. No.: 13/939,427

(22) Filed: Jul. 11, 2013

(65) Prior Publication Data

US 2014/0198978 A1    Jul. 17, 2014

(30) Foreign Application Priority Data

Jan. 11, 2013 (TW) .............................. 102101033 A (51) Int. Cl.
*G06K 9/00* (2006.01)
*G06T 17/05* (2011.01)

(52) U.S. Cl.
CPC ............ *G06K 9/00637* (2013.01); *G06T 17/05* (2013.01)

(58) Field of Classification Search
None
See application file for complete search history.

(56) References Cited

U.S. PATENT DOCUMENTS

| 8,825,454 B2* | 9/2014 | Pershing | 703/1 |
| 2003/0147553 A1* | 8/2003 | Chen et al. | 382/154 |
| 2009/0110267 A1* | 4/2009 | Zakhor et al. | 382/154 |
| 2012/0265494 A1* | 10/2012 | Chen et al. | 703/1 |
| 2013/0300740 A1* | 11/2013 | Snyder et al. | 345/420 |
| 2015/0022555 A1* | 1/2015 | Chau | 345/635 |

* cited by examiner

*Primary Examiner* — Vikkram Bali
(74) *Attorney, Agent, or Firm* — Jackson IPG PLLC; Demian K. Jackson (57) ABSTRACT

A method for searching a building roof facet and reconstructing a roof structure line, in which the searching is performed automatically and without limitation of how slope of the roof facet, and the building structure line is constructed through aerial imagery. At first, lidar point clouds on the roof are extracted to compose a roof facet by using coplanarity analysis, and the roof is differentiated to a possible flat roof and a pitched roof. An optimal roof facet is obtained by analyzing lidar point clouds to overcome the low pitched facet issue. A relationship of a roof facet on a 2-dimensional space is analyzed to ascertain an area of a roof structure line. An initial boundary is generated. Line detection is performed on the images and a roof structure line segment is composed. All the structure line segments are used to reconstructing a 3-dimensional building pattern in object space.

13 Claims, 9 Drawing Sheets

METHOD FOR SEARCHING A ROOF FACET AND CONSTRUCTING A BUILDING ROOF STRUCTURE LINE

FIELD OF THE INVENTION

The present invention relates to a method for searching a building roof facet and reconstructing a building roof structure line. Particularly, the present invention relates to a method for reconstructing a 3-dimensional building pattern by referring to a combination of lidar point clouds and aerial imagery, where a progressive building roof facet searching process is used to secure a more reliable facet. More specifically, the present invention relates to a method for reconstructing a building pattern with an improved correctness by using higher resolution aerial imagery with respect to a roof structure line for a low pitched building roof case, which is currently thought as a difficult issue.

DESCRIPTION OF THE RELATED ART

Normally, generation of building pattern information involved with lidar point clouds, aerial imagery and vector information. In the advanced implementation, reconstructing a building pattern employs information of aerial imagery only, lidar point clouds only, and a combination of aerial imagery and image point clouds.

Regarding the aerial imagery technology, three steps are usually included: feature extraction, image matching, and building reconstruction. In an image, a feature may be found through a gray level and a relationship between spatial connection. Matching includes area-based matching and feature-based matching. In the matching process, conjugate points or conjugate lines between images are determined, and thus relied upon to determine a 3-dimensional object position. Then, the conjugate points or conjugate lines in the object space are used to generate a building pattern. However, the image matching may bring about a matching error, which subsequently results in an erroneous 3-dimensional position.

Regarding the lidar point clouds technology, two steps are involved: coplanarity analysis and building reconstruction. The coplanarity analysis mainly includes grid coplanarity analysis, triangle net coplanarity analysis, and point group coplanarity analysis. The grid coplanarity analysis is performed by first interpolating point clouds to generate grid information prior to the real coplanarity analysis. However, an accuracy deterioration issue may happen with the interpolation with respect to the point clouds.

The triangle net coplanarity analysis is performed by first generating triangle information based on the point clouds prior to the real coplanarity analysis in the parameter space. However, the facet of the triangle net is composed by only three points, and thus leads to an unreliable facet.

The point group coplanarity analysis is performed by first composing a local facet from the local point groups, prior to the real coplanarity analysis in the parameter space. Based on the coplanarity analysis, building facets are generated and a building pattern is reconstructed according thereto. However, each of the above stated three coplanarity analyses has their challenges—the low pitched building roof patch portion may not be differentiated, and only high pitched portion is applicable. Further, since boundaries between lidar point clouds are relatively ambiguous, some assumptions are required to be introduced, such as boundary normalization. Thus, the currently available techniques are used without consideration of low pitched building roof, but only do with eligible the roof facets living up to their respective requirements.

Regarding the combination technology of aerial imagery and lidar point clouds, three steps are usually included: coplanarity analysis, line segmentation extraction, and building reconstruction. In doing this, the lidar point clouds are used for the coplanarity analysis to generate building facets, and based on which a keen boundary line in the images is generated. Based on the boundary line and an altitude of the lidar point clouds, a building pattern is reconstructed.

Since a multitude of connection fashions of the roof structure lines are possible, when only the aerial imagery is available, the roof structure line is usually generated from matching. However, such matching might be unreliable.

In the case where only the lidar point clouds are available, the roof structure line is an intersection between two adjacent facets. However, the roof facets may intersect at a point or a wall facet. Alternatively, the roof structure line obtained from the intersected facets might have a bias resulted from the composition of the facets or the weak intersection configuration of the roof structure line itself in the case where a low pitched roof exists. In this case, the roof structure line might have inaccurate intersection.

According to the third coplanarity analysis, an aerial image has a good ground object boundary, while the lidar point clouds include accurate high altitude information, leading to a possibility of reconstruction of a building pattern by means of aerial imagery and lidar point clouds. However, a building pattern is conventionally constructed by manually measuring a stereo image pair or semi-automation, and enhancing manually some unsound portion. In this time, the lidar point clouds are hard to be used for determination of the accurate boundary due to its poorly defined boundary.

In view of the current state that many countries has got involved with preparations of 3-dimensional digital city models, the current technologies have presented their shortcomings in facing the complicated building shapes, particularly with the issue that the low pitched roof facets are hard to be differentiated by itself or the roof structure line is hard to be automatically generated due to its complexity. In this regard, the prior art can not meet up with the real needs of users, and needs an improvement to be suggested.

SUMMARY OF THE INVENTION

In view of the shortcomings encountered in the prior art, it is, therefore, a primary object of the present invention to provide a method for searching a building roof facet and reconstructing a building roof structure line from a plurality of building roof facets, in which a building pattern where the building has a low pitched facet, which is hard to be achieved in the prior art, is automatically reconstructed, achieving a specific improvement.

It is a secondary objective of the present invention to provide a method for reconstructing a 3-dimensional building pattern by combining lidar point clouds and aerial imagery, and a method for searching a relatively more reliable roof facet by using a progressive roof facet searching process, to secure particularly for the case where a low pitched building roof exists and for case, in which higher resolution aerial imagery with respect to a determination of a roof structure line is used to secure an improved correctness of the building pattern.

It is still an objective of the present invention to provide a method for not only enhancing a correctness of a 3-dimensional building pattern but also enhancing the accuracy thereof simultaneously, which has a great contribution to the 3-dimensional building pattern field.

To achieve the above objects, the method for searching a building roof facet and reconstructing a building roof structure line from a plurality of building roof facets, comprising the steps of: (a) composing each of the plurality of building roof facets by lidar point clouds, respectively, and picking up at least an optimal roof facet by using a progressive roof facet searching process, which is performed, in essential, in the meanings of roof facets composition and classification; and enhancing an correctness of the roof; and b) projecting the roof facets onto a 2-dimensional space and determining an intersection stage of the roof facet by using of morphology, to determine an area of the roof structure line, establishing an initial boundary line, establishing each of structure lines by considering aerial imagery to generate a roof structure line in a 3-dimensional space, and enhancing an accuracy of the roof structure line by using the lidar point clouds, which is performed, in essential, in the meanings of composition of the roof structure line.

In an embodiment of the method, the step (a) further comprises the steps of: (a1) composing a triangle net pattern by using the lidar point clouds, filtering out point clouds on wall facet by using a normal vector of the triangle net pattern, and filtering out point clouds on ground facet by using a normalized altitude of the lidar point clouds, to obtain a set of roof point clouds; (a2) composing a relatively stable local facet by using a point group fashion process; (a3) determining a normal vector between local facets by using an region growing process, to compose assumptive roof facets; (a4) filtering out a non-roof facet from the assumptive roof facets by using four non-roof facet features; and (a5) differentiating roughly each of the roof facets into a pitched roof and a possible flat roof based on a pitched extent of each of the roof facets.

In an embodiment of the method, the four non-roof facets features includes containment, area, overlapping and isolation features, wherein the containment feature is characterized in that: an outer frame is established on the flat roof from a maximum flat facet by using a minimum area convexhull algorithm, and then determining the roof facets inside the outer frame by using a Point in Polygon algorithm, and taking the corresponding points as miscellaneous point groups and being filtered out if the altitude of inside polygons falls between a given range in a vertical direction with respect to the altitude of the outer frame; the area feature is characterized in that: an overly small area is filtered out; the overlapping feature is characterized in that: an overlapping percentage between each of the facets and facets adjacent thereto intersecting thereto from a maximum one of the facets, and each of the points corresponding to the facets having an overlapping percentage higher than a threshold is taken as being a redundant and unreliable facet and is filtered out; and the isolation feature is characterized in that: the facets are projected onto a 2-dimensional grid plane and are applied morphology, closing, and a maximum facet growing with region growing, and the facet is indicated as being adjacent to the facet if the facet and the facet overlap to each other, while the remaining facet without being included in the area is taken as an isolated structure or a point group and being filtered out.

In an embodiment of the method, the step (a) further comprises the steps of: (a6) each of the local facets is segmented by a plurality of given thresholds from a given high threshold to a low threshold thereamong, and the local facets are composed into a first roof facet by using a region growing process, and the first roof facet obtained from each of the local facets is composed into a second roof facet and the same composing process is repeated until a number of the final roof facet converges; (a7) searching a optimal low pitched roof facet; (a8) searching a flat roof facet, and determining if there is a connected flat roof facet based on a result of the low pitched facet, and picking up the connected flat roof facet; and (a9) comparing a percentage relationship between a possible flat roof facet and the picked roof facets to determine if the picked roof facet is correct, wherein the possible flat roof facet relates to one selected from a group consisting of a flat roof facet, the pitched roof facets and a combination of the flat roof facets and the pitched roof facets.

In an embodiment of the method, the step (a7) further comprises the steps of: (a71) searching, within each of adjacent thresholds, a roof facet having a planar area matching with an area of the roof facet and being equally pitched to the pitched facet; (a72) calculating a variation percentage between the roof facets picked in the step (a71) each corresponding to the adjacent thresholds from the highest threshold to the lowest threshold, and recording the variation state of the roof facets as the thresholds change; and (a73) picking up an optimal roof facet by referring to the variation percentage based on that when the variation percentage increases, the roof facet is growing, while when the variation percentage dramatically decreases, the roof facet becomes a breaking facet from the optimal facet.

In an embodiment of the method the searching of the flat roof facet in the step (a8) further comprises the steps of: (a81) searching, within each of adjacent thresholds, a roof facet having a planar area matching with an area of the roof facet and having an equally pitched facet matching with a flat roof facet; (a82) searching a flat roof facet for each of the adjacent thresholds from a threshold corresponding to the optimal pitched facet corresponding to the picked lowest threshold; and (a83) examining an intersecting state between each of the flat roof facets from the lowest threshold to the highest threshold and each of the optimal pitched facet corresponding thereto, and determining an optimal one nearly covering an entirety of the optimal pitched facet among the flat roof facets.

In the embodiment of the method the step (a9) further comprises the steps of: determining the possible flat roof facet as corresponding to a flat roof facet when no pitched facet is searched out, while calculating and comparing a first number of the point clouds on each of the pitched facets with a second number of the possible roof facet, determining each of the generated pitched facets is correctly and determining the possible flat roof facet is composed of the generated pitched facets when the first and second numbers are compared to be the same, taking the searched pitched facet as a breaking facet when the first and second numbers differ from each other with a difference larger than a given value and determining the possible flat roof facet as corresponding to a flat roof facet, and determining the possible flat roof facet is composed by the generated pitched facets and flat roof facets if the first number is equivalent to second numbers and taking the searched facet as a breaking facet and determining the possible flat facet as corresponding to a flat roof facet when the first and second numbers differ from each other with a difference larger than a given value.

In the embodiment of the method, the determined area of the roof structure line in the step of (b), is back-projected onto the aerial imagery, to determine a position of the area of the roof structure line on the aerial imagery.

In the embodiment of the method, the step of determining the intersection state of the roof facet by using of morphology in the step (b) further comprises the steps of: (b1) projecting each of the roof facets at the same area onto the 2-dimensional grid plane, and applying morphology, closing, to each of the projected roof facets; (b2) picking up a pair of the roof facets adjacent to each other for each of the roof facets on the 2-dimensional grid plane; (b3) deducting a remaining roof facet at the same area from the pair of the adjacent roof facets for each of the roof facets on the 2-dimensional grid plane; (b4) if each of pair of the adjacent roof facets is separated from each other, taking each of the pair of the adjacent roof facets as intersecting at a point, for each of the roof facets on the 2-dimensional plane, and (b5) if each of pair of the adjacent roof facets is connected to each other, taking an overlapping area of the pair of the adjacent roof facets as the area of the roof structure line, for each of the roof facets on the 2-dimensional plane.

In an embodiment, the determination of the position of the roof structure line on the aerial imagery comprises the steps of: (b6) searching for an altitude of a nearest one among the lidar point clouds on the 2-dimensional plane; (b7) back-projecting the determined area of the roof structure line onto the aerial imagery by using the planar position of the grids at the area and the altitude of the nearest one of the lidar point cloud; (b8) opening a range for each of the back-projected grids onto the aerial imagery to generate a work area of the roof structure line; and (b9) detecting lines at the work area of the roof structure line and composing 2-dimensional line segments, and selecting a longest line segment as the roof structure line.

In an embodiment, step (b) of generating the roof structure line in the 3-dimensional space is performed by taking an altitude between one and the other ends of the line segment as an altitude of the nearest one of the back-projected grids, and projecting structure line segments onto the object space to generate the 3-dimensional roof structure line.

In an embodiment, step (b) of enhancing the accuracy of the roof structure line by using the lidar point clouds is performed by establishing a 3-dimensional line segment of the object space by using the structure line segments of the 3-dimensional roof facets and an outer frame line segments; establishing a pattern based on the 3-dimensional line segments; locating the lidar point clouds in the pattern by using of the Point in Polygon algorithm; and correcting the 3-dimensional facet and the altitude of the roof structure line corresponding thereto by Least Squares method.

BRIEF DESCRIPTIONS OF THE DRAWINGS

The present invention will be better understood from the following detailed descriptions of the preferred embodiments according to the present invention, taken in conjunction with the accompanying drawings, in which.

DESCRIPTION OF THE PREFERRED EMBODIMENTS

The present invention will be described in detail in accompany with FIG. 1 to FIG. 9.

Figure 1:
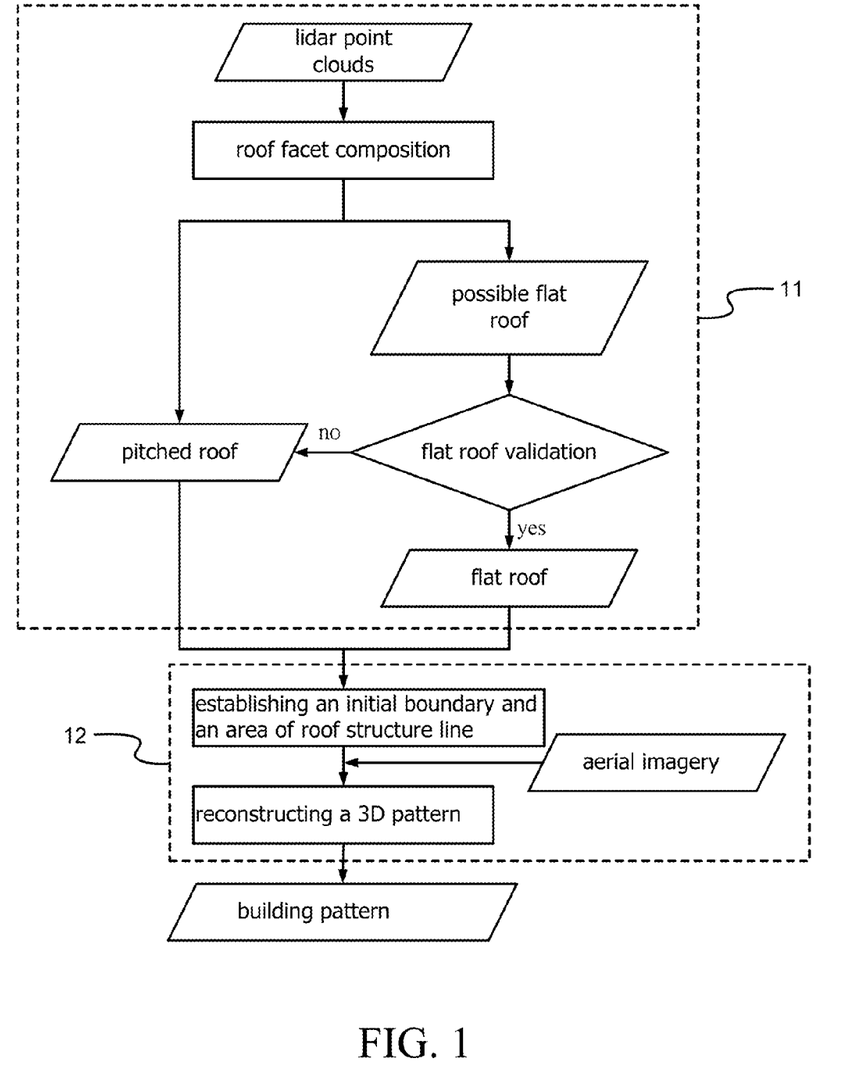
FIG. 1 is a schematic flowchart of a method for reconstructing a 3-dimensional building patter according to the present invention.
Figure 2:
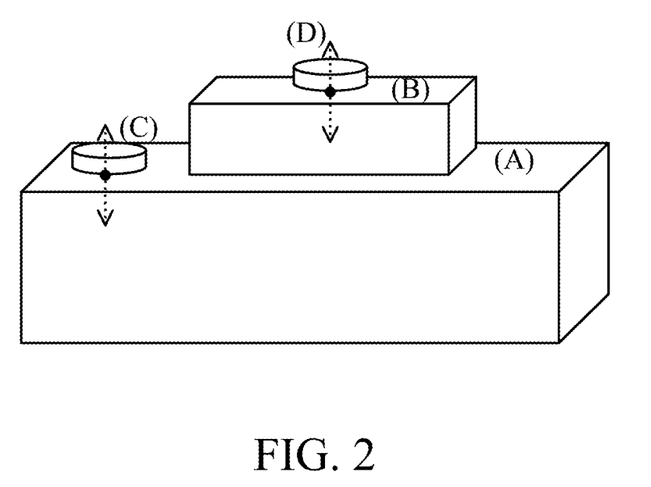
FIG. 2 is a schematic diagram for explaining how miscellaneous point groups in a roof are determined based on containment feature according to the present invention.
Figure 3:
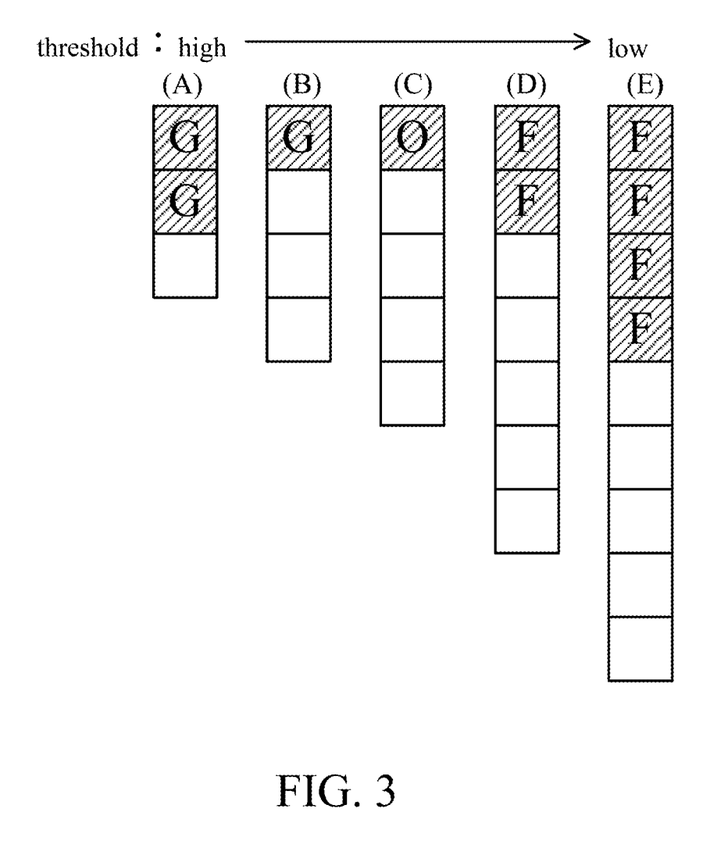
FIG. 3 is a schematic diagram for explaining how an optimal low pitched facet is searched according to the present invention.
Figure 4:
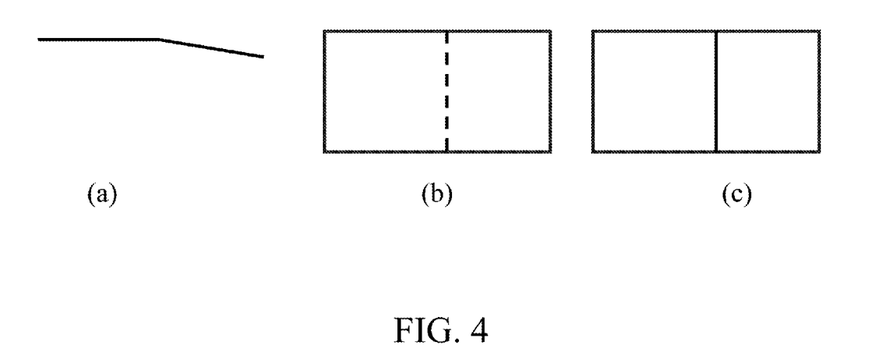
FIG. 4 is a schematic diagram for explaining how a pitched roof with a low pitched facet is generated from a possible flat roof facet according to the present invention.
Figure 5:
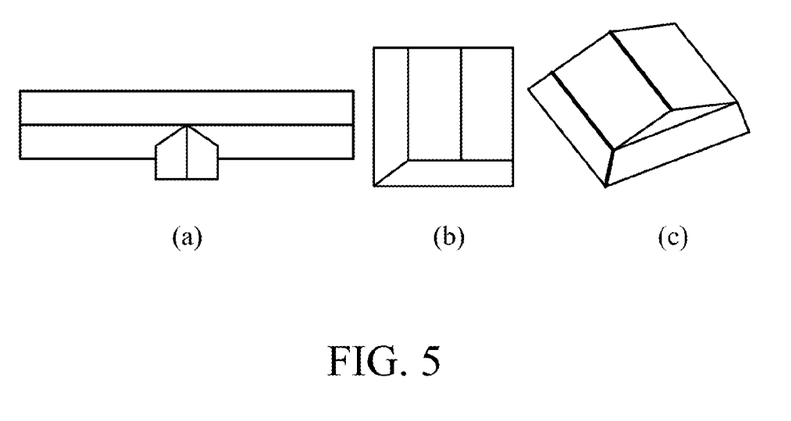
FIG. 5 is a schematic diagram showing different types of roof structure lines according to the present invention.
Figure 6:
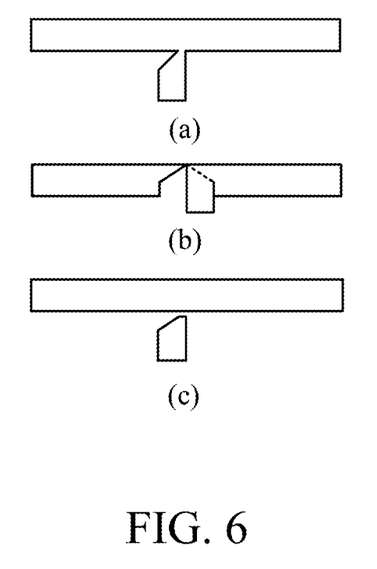
FIG. 6 is a schematic diagram for explaining how the type of an intersection between two adjacent facets is determined according to the present invention.
Figure 7:
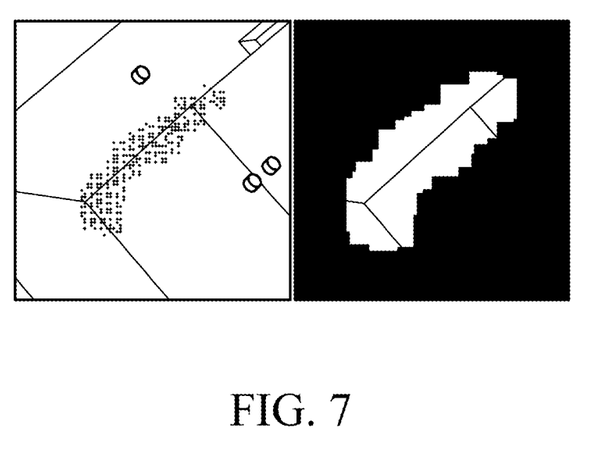
FIG. 7 is a schematic diagram showing a work area for extracting a roof structure line according to the present invention.
Figure 8:
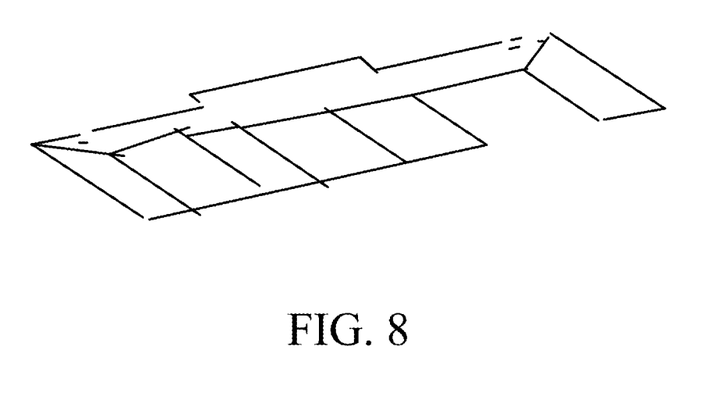
FIG. 8 is a schematic side view of a roof structure line segment and an outer frame line segment according to the present invention.
Figure 9:
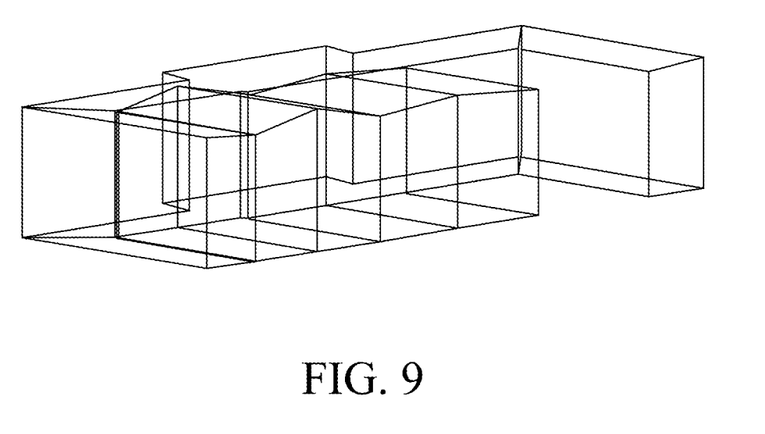
FIG. 9 is a schematic diagram for explaining how a building pattern is reconstructed and how a roof facet altitude of a corrected lidar point clouds is utilized according to the present invention.

In the drawings, FIG. 1 is a schematic flowchart of a method for reconstructing a 3-dimensional building patter according to the present invention. FIG. 2 is a schematic diagram for explaining how miscellaneous point groups in a roof are determined based on containment feature according to the present invention. FIG. 3 is a schematic diagram for explaining how an optimal low pitched facet is searched according to the present invention. FIG. 4 is a schematic diagram for explaining how a pitched roof with a low pitched facet is generated from a possible flat roof facet according to the present invention. FIG. 5 is a schematic diagram showing different types of roof structure lines according to the present invention. FIG. 6 is a schematic diagram for explaining how the type of an intersection between two adjacent facets is determined according to the present invention. FIG. 7 is a schematic diagram showing a work area for extracting a roof structure line according to the present invention. FIG. 8 is a schematic side view of a roof structure line segment and an outer frame line segment according to the present invention. FIG. 9 is a schematic diagram for explaining how a building pattern is reconstructed and how a roof facet altitude of a corrected lidar point clouds is utilized according to the present invention.

At first, the present invention is a method for searching a roof facet and reconstructing a roof structure line from building roof facets. This method comprises the following steps. Step (a): composing each of the building roof facets by lidar point clouds, respectively. And then, picking up at least an optimal roof facet by using a progressive roof facet searching process, which is performed, in essential, in the meanings of roof facets composition and classification (11). Then, enhancing an correctness of the roof. Step (b): projecting the roof facets onto a 2-dimensional space and determining an intersection of the roof facets by using of morphology, to determine an area of the roof structure line, establishing an initial boundary line, establishing each of structure lines by considering aerial imagery to generate a roof structure line in a 3-dimensional space, and enhancing an accuracy of the roof structure line by using the lidar point clouds, which is performed, in essential, in the meanings of composition of the rood structure line (12).

In the method, the step (a) further comprises the following steps (a1), (a2), (a3) and (a4).

Step (a1): a triangle net pattern by using the lidar point clouds is composed. Point clouds on wall facet by using a normal vector of the triangle net pattern is filtered out, and point clouds on ground facet by using a normalized altitude of the lidar point clouds are filtered out, to obtain a set of roof point clouds.

Step (a2): a relatively stable local facet is composed by using a point group process.

Step (a3): a normal vector between local facets by using region growing process is determined, to compose assumptive roof facets.

In step (a), the sub-step of composing each of the plurality of building roof facets by lidar point clouds, respectively comprises the following steps.

Step (a4): a non-roof facet from the assumptive roof facets is filtered out by using four non-roof facet features.

The four non-roof facet features include containment, area, overlapping and isolation features. Based on the containment feature, grouped points such large scale miscellanies are removed. Since large miscellanies are most located on a flat roof, the process for locating large scale miscellanies is launched from a maximum facet. An outer frame is established on the flat roof facet from the maximum flat facet by using a minimum area convexhull algorithm. Then, the polygon inside the frame is determined, by using a Point in Polygon algorithm. The inner polygons are taken as miscellaneous point groups and filtering out, if the altitude of the inner polygon has a difference with the altitude of the outer polygon no more than a given value.

As shown in FIG. 2, when the containment feature is used to determine the miscellaneous point group on the roof facet, facet B and facet C are each considered as a miscellaneous point group. The area feature is used to filter out an overly small area. The overlapping point groups are filtered out. In composing a facet, unreliable point group may not be used, such as a point group on a roof structure line and a wall edge. In fact, a local facet composed by grouped points may have overlapping point clouds. When the overlapping point groups are overly large, these point groups are considered as redundant. In this regard, an overlapping percentage between each of the facets and facets adjacent thereto intersecting thereto is determined beginning from a maximum one of the facets. For one such facet, when the points thereon has an overly large overlapping percentage, the points are taken as being redundant and unreliable points and are filtered out.

In addition, since the method is suitable to the case where buildings are reconstructed one by one, the isolation feature is characterized in that the facets are projected onto a 2-dimensional grid plane and are applied morphology, closing.

In a 2-dimensional grid plane, a maximum facet is growing with region growing. If a facet and one or some facets overlap to each other, then the facet is indicated as being adjacent to the overlapping facet. On the other hand, the remaining facets without being included in the area are each taken as an isolated structure or a point group and are filtered out.

Step (a5): differentiating roughly each of the roof facets into a pitched roof and a possible flat roof based on a pitched extent of each of the roof facets.

The progressive roof facet searching process further comprises the following steps.

Step (a6): each of the local facets is segmented by a plurality of given thresholds from a given high threshold to low threshold, which may differentiate a flat facet and pitched facet. The local facets are composed into a roof facet by using a region growing process for each of the local facets, and the roof facet obtained from each of the local facets is composed into another roof facet and the same composing process is repeated until a number of the final roof facet converges.

Step (a7): a low optimal pitched facet is searched.

Step (a8): a flat roof facet is searched, and if there is a connected flat roof facet based on a result of the optimal low pitched facet is determined, and the connected flat roof facet is picked up; and Step (a9): a percentage relationship between a possible flat roof facet and the picked roof facets, respectively, is compared to determine if the picked roof facet is correct. The possible flat roof facet may be one of a flat roof building, a pitched roof facet and a combination of the flat roof facets and the pitched facets.

Step (a7) further comprises the following steps.

Step (a71): within each threshold, a roof facet having a planar area matching with an area of the roof facet and being equally pitched to the pitched facet is searched.

Step (a72): a variation percentage between the roof facets picked in the step (a71) each corresponding to the threshold is calculated from the highest threshold to the lowest threshold, and the variation state of the roof facets as the thresholds change is recorded.

Since a low-pitched facet may experience three stages: a growth facet, an optimal facet and a breaking facet, the variation percentage from the high threshold to the low threshold determines the optimal stage. In this regard, Step (a73) is performed where the optimal roof facet are picked up, by referring to the variation percentage. When the variation percentage increases, the roof facet is growing. When the variation percentage dramatically decreases, the roof facet is entering into a breaking facet from the optimal facet.

As shown in FIG. 3, a grid is, in each of the thresholds, an area meeting up with a pitched extent of a pitched facet and an area of a roof facet. A grid in a texture is the roof facets corresponding to each other in the different thresholds. A variation between adjacent two of the thresholds is described as a percentage. By referring to the variation percentage, which stage where the roof facet is at may be determined, in which G denotes the growth facet, O denotes the optimal facet, and F denotes the breaking facet.

Step (a8): a flat roof facet is searched, and if there is a connected flat roof facet is determined based on a result of the lowest pitched facet. And the connected flat roof facet is picked up.

Step (a8) comprises the following steps.

Step (a81): within each of the thresholds, a roof facet having a planar area matching with an area of the roof facet and being equally pitched to the flat roof facet is searched.

Step (a82): beginning from a threshold corresponding to the optimal pitched facet corresponding to the picked lowest threshold, a flat roof facet for each of the thresholds is searched. Since the low pitched facet is separated from the possible flat facets, if the possible flat facets are composed of the low pitch facet and the flat facet, the optimal flat facet is generated at the same time when the optimal pitched facet. As shown in FIG. 4, in which figure (a) is a lateral view of a roof composed of a flat facet and a pitched facet, figure (b) shows the roof facet generated at a relatively high threshold gap, and figure (c) shows the flat facet generated at the same time when the pitched facet is generated.

Step (a83): beginning from the lowest threshold to the highest threshold and each of the optimal pitched facets corresponding thereto, the intersecting state between each of the flat roof facets is determined. And, when the flat facet nearly covers the entire optimal pitched facet, the flat facet is determined as the optimal one among the flat roof facets.

Step (a9): a percentage relationship between a possible flat roof facet and the picked roof facets, respectively, is compared to determine if the picked roof facet is correct. The possible flat roof facet is composed of a flat roof facet, the pitched roof facets and a combination of the flat roof facets and the pitched roof facets.

When no pitched facet is searched out, the possible flat roof facet is determined as corresponding to a flat roof facet. A number of the point clouds on each of the pitched facets with is calculated and compared with a number of the possible roof facet. Each of the generated pitched facets is determined as being correctly obtained. And the possible flat roof facet is determined as being composed of the generated pitched facets when the numbers of the point clouds on each of the pitched facets and the possible roof facet are compared to be the same. The searched pitched facet is taken as a breaking facet when the numbers mentioned above have an overly large difference. And the flat roof facet is determined as corresponding to a flat roof facet. And the possible flat roof facet is determined as being composed by the generated pitched facets and flat roof facets if the above mentioned numbers are equal. And the searched facet is taken as a breaking facet and the possible flat facet is taken as corresponding to a flat roof facet when the numbers mentioned above have an overly large difference.

In step (b), the roof structure line may be composed by an intersection of the adjacent roof facets in a point or line form. Such different state of intersections and roof structure line types are shown in FIG. 5, in which figure (a) shows the adjacent roof facets are connected at a point or a line, figure (b) shows the roof structure line may be clearly shown in the image, and figure (c) shows the roof structure line may not be completely generated in the case of composition of intersection of object spaces. In this regard, it is necessary to determine an area of the roof structure line based on how the roof structure is composed by the intersection of the adjacent roof facets. To achieve, here the adjacent roof facets are projected onto a 2-dimensional space, and the result is subjected to morphology.

In Step (b), the sub-step of determining the intersection state of the roof facet by using of morphology further comprises the following steps.

Step (b1) each of the roof facets at the same area is projected onto the 2-dimensional grid plane and each of the projected roof facets is applied morphology, closing.

Step (b2): a pair of the roof facets adjacent to each other is picked up for each of the roof facets on the 2-dimensional grid plane;

Step (b3): a remaining roof facet at the same area from the pair of the adjacent roof facets is deducted for each of the roof facets on the 2-dimensional grid plane.

Step (b4): if each of the pair of the adjacent facets is separated from each other, each of the pair of the adjacent roof facets is taken as intersecting at a point, for each of the roof facets on the 2-dimensional grid plane. As shown in FIG. 6, figure (a) shows the two adjacent roof facets after being projected onto a 2-dimensional grid plane and applied morphology, closing, Figure (b) shows the other roof facet projection in the same area, figure c shows the two adjacent roof facets with deduction of the other roof facets, in which if no connection is presented, the two adjacent roof facets are known to have an intersection of a point.

Step (b5): if each of the pair of the adjacent roof facets is not separated with each other, an overlapping area of the pair of the adjacent roof facets is taken as the area of the roof structure line, for each of the roof facets on the 2-dimensional plane.

After the determination of the area of the roof structure line, the area is back-projected onto an aerial imagery to determine a position on the aerial imagery. In doing this, the following steps are performed.

Step (b6): an altitude of a nearest one among the lidar point clouds on the 2-dimensional grid plane is searched.

Step (b7): the determined area of the roof structure line is back-projected onto the aerial imagery by using the planar position of the grids at the area and the altitude of the nearest one of the lidar point clouds.

Step (b8): a range for each of the grids back-projected onto the aerial imagery is opened to generate a work area of the roof structure line.

Step (b9): a line at the work area of the roof structure line is detected and 2-dimensional line segments are composed, and a longest line segment as the roof structure line is selected.

FIG. 7 shows the work area of the extracted roof structure line, in which figure (a) shows back-projected 2-dimensional grids and the altitudes of the lidar point clouds in the aerial imagery, and figure (b) shows the opened roof structure line work area to generate the roof structure line.

In step (b), the sub-step of generating the roof structure line in the 3-dimensional space is further performed by the following process.

An altitude between one and the other ends of the line segmentation is taken as an altitude of the nearest one of the back-projected grids. The roof structure line is projected to the object space to generate the 3-dimensional roof structure line based on the altitude of the nearest one of the back-projected grids and the planar position of the aerial image, as shown in FIG. 8. Further, the lidar point clouds are used to enhance the accuracy of the roof structure line. Further, the 3-dimensional line segments in the object space is established by using the structure line segments of the 3-dimensional roof facets and the outer frame line segments. And a pattern is established based on the 3-dimensional line segments. And the lidar point clouds in the pattern are located by the Point in Polygon algorithm. Finally, the 3-dimensional facet and the altitude of the roof structure line corresponding thereto are corrected by Minimum Square method. This is shown in FIG. 9.

Based on the above, the present invention achieves its reconstructing a building pattern by combining lidar point clouds and aerial imagery. The features comprises searching of a more reliable roof facet by using of the progressive roof searching method, particularly for the case of low pitched facet, conventionally very difficult to cope with. Further, higher resolution aerial imagery is used to enhance the correctness of the reconstruction of the building pattern.

In comparison with the prior art, the present invention has the following advantages:

For the part of the roof facet, the present invention takes different slope of pitched facets in to consideration. It may automatically search the differently slope of pitched roof facets and find an appropriate threshold for each of the roof facets, making a composition of the roof facet exempted from being limited on a single threshold and accordingly enhancing the correctness of the roof facets.

For the part of the roof structure line, since the adjacent roof facets are possible to connect at a point or at a state poof the roof facet goes along a wall facet. The composition of the roof structure line is considered correspondingly by using of a relationship of the planar space of the roof facets composed by lidar point clouds and generation of aerial imagery.

For the part of the roof structure line, the roof facet is projected onto a 2-dimensional plane, a connection relationship between roof facets is determined with morphology. Upon determination of the connection relationship, the roof structure lines are reconstructed with aerial imagery, lidar point clouds are employed to modify the altitude of the roof structure lines. Hence, the present invention achieves in accuracy of the 3-dimensional building pattern reconstruction. Therefore, the present invention can be deemed as more practical, improved and necessary to users, compared with the prior art.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the claims.

What is claimed is:

1. A method for searching a building roof facet and reconstructing a building roof structure line from a plurality of building roof facets, comprising the steps of:
   (a) composing each of the plurality of building roof facets by lidar point clouds, respectively, and picking up at least an optimal roof facet by using a progressive roof facet searching process;
   the step (a) further comprises the steps of:
   (a1) composing a triangle net pattern by using the lidar point clouds, filtering out point clouds on wall facet by using a normal vector of the triangle net pattern, and filtering out point clouds on ground facet by using a normalized altitude of the lidar point clouds, to obtain a set of roof point clouds;
   (a2) composing a relatively stable local facet by using a point group fashion process;
   (a3) determining a normal vector between local facets by using an region growing process, to compose assumptive roof facets;
   (a4) filtering out a non-roof facet from the assumptive roof facets by using four non-roof facet features;
   (a5) differentiating roughly each of the roof facets into a pitched roof and a possible flat roof based on a pitched extent of each of the roof facets; and
   (b) projecting the roof facets onto a 2-dimensional space and determining an intersection stage of the roof facet by using of morphology, to determine an area of the roof structure line, establishing an initial boundary line, establishing each of structure lines by considering aerial imagery to generate a roof structure line in a 3-dimensional space, and enhancing an accuracy of the roof structure line by using the lidar point clouds.

2. The method according to claim 1, wherein the four non-roof facets features includes containment, area, overlapping and isolation features, wherein containment feature is characterized in that:
   an outer frame is established on the flat roof from a maximum flat facet by using a minimum area convexhull algorithm, and then determining the roof facets inside the outer frame by using a Point in Polygon algorithm, and taking the corresponding points as miscellaneous point groups and being filtered out if the altitude of inside polygons falls between a given range in a vertical direction with respect to the altitude of the outer frame;
   the area feature is characterized in that:
   an overly small area is filtered out;
   the overlapping feature is characterized in that:
   an overlapping percentage between each of the facets and facets adjacent thereto intersecting thereto from a maximum one of the facets, and each of the points corresponding to the facets having an overlapping percentage higher than a threshold is taken as being a redundant and unreliable facet and is filtered out; and
   the isolation feature is characterized in that:
   the facets are projected onto a 2-dimensional grid plane and are applied morphology, closing, and a maximum facet is growing with region growing, and the facet is indicated as being adjacent to the facet if the facet and the facet overlap to each other, while the remaining facet without being included in the area is taken as an isolated structure or a point group and being filtered out.

3. The method as claimed in claim 1, wherein the step (a) further comprises the steps of:
   (a6) each of the local facets is segmented by a plurality of given thresholds from a given high threshold to a low threshold thereamong, and the local facets are composed into a first roof facet by using a region growing process, and the first roof facet obtained from each of the local facets is composed into a second roof facet and the same composing process is repeated until a number of the final roof facet converges;
   (a7) searching a optimal low pitched roof facet;
   (a8) searching a flat roof facet, and determining if there is a connected flat roof facet based on a result of the low pitched facet, and picking up the connected flat roof facet; and
   (a9) comparing a percentage relationship between a possible flat roof facet and the picked roof facets to determine if the picked roof facet is correct, wherein the possible flat roof facet relates to one selected from a group consisting of a flat roof facet, the pitched roof facets and a combination of the flat roof facets and the pitched roof facets.

4. The method as claimed in claim 3, wherein the step (a7) further comprises the steps of:
   (a71) searching, within each of adjacent thresholds, a roof facet having a planar area matching with an area of the roof facet and being equally pitched to the pitched facet;
   (a72) calculating a variation percentage between the roof facets picked in the step (a71) each corresponding to the adjacent thresholds from the highest threshold to the lowest threshold, and recording the variation state of the roof facets as the thresholds change; and
   (a73) picking up an optimal roof facet by referring to the variation percentage based on that when the variation percentage increases, the roof facet is growing, while when the variation percentage dramatically decreases, the roof facet becomes a breaking facet from the optimal facet.

5. The method as claimed in claim 3, wherein searching the flat roof facet in the step (a8) further comprises the steps of:
   (a81) searching, within each of adjacent thresholds, a roof facet having a planar area matching with an area of the roof facet and having an equally pitched facet matching with a flat roof facet;
   (a82) searching a flat roof facet for each of the adjacent thresholds from a threshold corresponding to the optimal pitched facet corresponding to the picked lowest threshold; and
   (a83) examining an intersecting state between each of the flat roof facets from the lowest threshold to the highest threshold and each of the optimal pitched facets corresponding thereto, and determining an optimal one nearly covering an entirety of the optimal pitched facet among the flat roof facets.

6. The method as claimed in claim 3, wherein the step (a9) further comprises the steps of:
   determining the possible flat roof facet as corresponding to a flat roof facet when no pitched facet is searched out, while calculating and comparing a first number of the point clouds on each of the pitched facets with a second number of the possible roof facet, determining each of the generated pitched facets is correctly and determining the possible flat roof facet is composed of the generated pitched facets when the first and second numbers are compared to be the same, taking the searched pitched facet as a breaking facet when the first and second numbers differ from each other with a difference larger than a given value and determining the possible flat roof facet as corresponding to a flat roof facet, and determining the possible flat roof facet is composed by the generated pitched facets and flat roof facets if the first number is equivalent to second numbers and taking the searched facet as a breaking facet and determining the possible flat facet as corresponding to a flat roof facet when the first and second numbers differ from each other with a difference larger than a given value.

7. The method as claimed in claim 1, wherein the determined area of the roof structure line, in the step of (b), is back-projected onto the aerial imagery, to determine a position of the area of the roof structure line on the aerial imagery.

8. The method as claimed in claim 7, wherein the determination of the position of the roof structure line on the aerial imagery comprises the steps of:
(b6) searching for an altitude of a nearest one among the lidar point clouds on the 2-dimensional plane;
(b7) back-projecting the determined area of the roof structure line onto the aerial imagery by using the planar position of the grids at the area and the altitude of the nearest one of the lidar point cloud;
(b8) opening a range for each of the back-projected grids onto the aerial imagery to generate a work area of the roof structure line; and
(b9) detecting lines at the work area of the roof structure line and composing 2-dimensional line segments, and selecting a longest line segment as the roof structure line.

9. The method as claimed in claim 8, wherein the step, in step (b), of establishing each of the structure lines by considering aerial imagery to generate the roof structure line in the 3-dimensional space further comprises the steps of:
taking an altitude between one and the other ends of the line segment as an altitude of the nearest one of the back-projected grids, and projecting structure line segments onto the object space to generate the 3-dimensional roof structure line; and
enhancing the accuracy of the roof structure line by using the lidar point clouds.

10. The method as claimed in claim 1, wherein the step of determining the intersection state of the roof facet by using of morphology in the step (b) further comprises the steps of:
(b1) projecting each of the roof facets at the same area onto the 2-dimensinal grid plane, and applying morphology, closing, to each of the projected roof facets;
(b2) picking up a pair of the roof facets adjacent to each other for each of the roof facets on the 2-dimensional grid plane;
(b3) deducting a remaining roof facet at the same area from the pair of the adjacent roof facets for each of the roof facets on the 2-dimensional grid plane;
(b4) if each of pair of the adjacent roof facets is separated from each other, taking each of the pair of the adjacent roof facets as intersecting at a point, for each of the roof facets on the 2-dimensional plane; and
(b5) if each of pair of the adjacent roof facets is connected to each other, taking an overlapping area of the pair of the adjacent roof facets as the area of the roof structure line, for each of the roof facets on the 2-dimensional plane.

11. The method as claimed in claim 1, wherein the step, in the step (b), of enhancing the accuracy of the roof structure line by using the lidar point clouds further comprises the steps of:

establishing a 3-dimensioanl line segment of the object space by using the structure line segments of the 3-dimensional roof facets and an outer frame line segments;
establishing a pattern based on the 3-dimensional line segments;
locating the lidar point clouds in the pattern by using of the Point in Polygon algorithm; and
correcting the 3-dimensional facet and the altitude of the roof structure line corresponding thereto by Least Squares method.

12. A method for searching a building roof facet and reconstructing a building roof structure line from a plurality of building roof facets, comprising the steps of:
(a) composing each of the plurality of building roof facets by lidar point clouds, respectively, and picking up at least an optimal roof facet by using a progressive roof facet searching process,
wherein the step (a) further comprises the steps of:
(a6) each of the local facets is segmented by a plurality of given thresholds from a given high threshold to a low threshold thereamong, and the local facets are composed into a first roof facet by using a region growing process, and the first roof facet obtained from each of the local facets is composed into a second roof facet and the same composing process is repeated until a number of the final roof facet converges;
(a7) searching a optimal low pitched roof facet;
(a8) searching a flat roof facet, and determining if there is a connected flat roof facet based on a result of the low pitched facet, and picking up the connected flat roof facet; and
(a9) comparing a percentage relationship between a possible flat roof facet and the picked roof facets to determine if the picked roof facet is correct, wherein the possible flat roof facet relates to one selected from a group consisting of a flat roof facet, the pitched roof facets and a combination of the flat roof facets and the pitched roof facets; and
(b) projecting the roof facets onto a 2-dimensional space and determining an intersection stage of the roof facet by using of morphology, to determine an area of the roof structure line, establishing an initial boundary line, establishing each of structure lines by considering aerial imagery to generate a roof structure line in a 3-dimensional space, and enhancing an accuracy of the roof structure line by using the lidar point clouds.

13. A method for searching a building roof facet and reconstructing a building roof structure line from a plurality of building roof facets, comprising the steps of:
(a) composing each of the plurality of building roof facets by lidar point clouds, respectively, and picking up at least an optimal roof facet by using a progressive roof facet searching process; and
(b) projecting the roof facets onto a 2-dimensional space and determining an intersection stage of the roof facet by using of morphology, to determine an area of the roof structure line, establishing an initial boundary line, establishing each of structure lines by considering aerial imagery to generate a roof structure line in a 3-dimensional space, and enhancing an accuracy of the roof structure line by using the lidar point clouds,
wherein the step of determining the intersection state of the roof facet by using of morphology in the step (b) further comprises the steps of:
(b1) projecting each of the roof facets at the same area onto the 2-dimensinal grid plane, and applying morphology, closing, to each of the projected roof facets;

(b2) picking up a pair of the roof facets adjacent to each other for each of the roof facets on the 2-dimensional grid plane;

(b3) deducting a remaining roof facet at the same area from the pair of the adjacent roof facets for each of the roof facets on the 2-dimensional grid plane;

(b4) if each of pair of the adjacent roof facets is separated from each other, taking each of the pair of the adjacent roof facets as intersecting at a point, for each of the roof facets on the 2-dimensional plane; and (b5) if each of pair of the adjacent roof facets is connected to each other, taking an overlapping area of the pair of the adjacent roof facets as the area of the roof structure line, for each of the roof facets on the 2-dimensional plane.

* * * * *